US010327395B2

(12) United States Patent
Gierkink

(10) Patent No.: US 10,327,395 B2
(45) Date of Patent: Jun. 25, 2019

(54) HEAD FOR HARVESTING OF TREES AND VEHICLE PROVIDED WITH THE IMPROVED HEAD

(71) Applicant: Michel Bernardus Johanna Gierkink, Vragender (NL)

(72) Inventor: Michel Bernardus Johanna Gierkink, Vragender (NL)

(73) Assignee: GIERKINK EXPLOITATIE B.V., Vragender (NL)

( * ) Notice: Subject to any disclaimer, the term of this patent is extended or adjusted under 35 U.S.C. 154(b) by 263 days.

(21) Appl. No.: 15/343,244

(22) Filed: Nov. 4, 2016

(65) Prior Publication Data

US 2018/0125007 A1 May 10, 2018

(51) Int. Cl.
 *A01G 23/081* (2006.01)
(52) U.S. Cl.
 CPC .................................. *A01G 23/081* (2013.01)
(58) Field of Classification Search
 CPC .... A01G 23/08; A01G 23/081; A01G 23/091; A01G 23/093; A01G 23/095
 See application file for complete search history.

(56) References Cited

U.S. PATENT DOCUMENTS

| 3,796,242 A | 3/1974 | Albright |
| 4,175,598 A | 11/1979 | Stoychoff |
| 5,129,438 A * | 7/1992 | Hamilton ............. A01G 23/081 144/24.13 |
| 5,267,594 A * | 12/1993 | Wiemeri ............. A01G 23/091 144/336 |
| 6,374,877 B1 | 4/2002 | Wildey |
| 6,408,906 B1 | 6/2002 | Moon |
| 7,644,580 B2 * | 1/2010 | Alfthan ................ A01G 23/095 60/425 |

FOREIGN PATENT DOCUMENTS

WO    WO 2011078673 A1 *  6/2011    ........... A01G 23/081

OTHER PUBLICATIONS

International Search Report for PCT/NL2010/050883, dated May 25, 2011.
Dutch Patent Office Search Report for NL 1037584, dated Jun. 23, 2010.

\* cited by examiner

*Primary Examiner* — Matthew Katcoff
(74) *Attorney, Agent, or Firm* — Oppedahl Patent Law Firm LLC

(57) ABSTRACT

The invention relates to an improved head for harvesting of trees. In particular, the head according to the invention is an improvement of a head for harvesting of trees as disclosed in European Patent EP2515628, which state of art is hereby incorporated by reference. In the known head, the balance between the saw pressure and the saw speed is controlled by the oil pressure at the inlet port of the hydraulic motor. This has the drawback that the saw pressure is depending on the saw speed. It is the aim of the invention to provide an improved head for harvesting trees, wherein the saw pressure is constant and independent of the saw speed.

5 Claims, 2 Drawing Sheets

HEAD FOR HARVESTING OF TREES AND VEHICLE PROVIDED WITH THE IMPROVED HEAD

The invention relates to an improved head for harvesting of trees.

In particular, the head according to the invention is an improvement of a head for harvesting of trees as disclosed in European Patent EP2515628, which state of art is hereby incorporated by reference.

EP2515628 discloses a hydraulically controlled head for harvesting trees, which head is arranged for attachment on a vehicle with a hydraulic pump unit, which head comprises a
- double-action hydraulic valve for connecting to the hydraulic pump unit,
- a clamp for placement round a tree, comprising a first hydraulic actuator
- a tilting device for tilting the clamp, comprising a second hydraulic actuator,
- a chainsaw for sawing through a clamped tree, comprising a hydraulic motor,
- a saw displacement device for causing the blade of the chainsaw to move out of and into a saw casing, comprising a third hydraulic actuator and
- a first pressure line and a second pressure line for connecting the hydraulic valve to the first hydraulic actuator, the second hydraulic actuator and the third hydraulic actuator,
- the hydraulic motor comprises an inlet port, a first outlet port and a drain port, wherein the drain port is connected via a non-return valve to the first pressure line and is provided with a first hydraulic accumulator, and the first outlet port is connected via a throttle control valve and a non-return valve to the first pressure line, and the first inlet port is connected to the second pressure line,
wherein the third hydraulic actuator comprises a double-action hydraulic cylinder which is connected to the first outlet port of the hydraulic motor and, via a second throttle non-return valve, to a second hydraulic accumulator, and
- a hydraulic control unit suitable for controlling the first hydraulic actuator, the second hydraulic actuator and the third hydraulic actuator and the hydraulic motor.

In the known head, the balance between the saw pressure and the saw speed is controlled by the oil pressure at the inlet port of the hydraulic motor. This has the drawback that the saw pressure is depending on the saw speed.

It is the aim of the invention to provide an improved head for harvesting trees, wherein the saw pressure is constant and independent of the saw speed.

The improved head therefore has the characterizing feature that the head comprises control means for controlling the saw pressure and the saw speed by the oil pressure at the first outlet port of the hydraulic motor.

Preferably this is achieved by providing a pressure relief valve connecting the first outlet port to the pressure line parallel over the throttle control valve and the non-return valve. By this feature the oil pressure on the first outlet port is kept constant and therefore the pressure of the hydraulic cylinder of the saw displacement device acting on the tree is kept constant. The saw pressure can be controlled by controlling the pressure relieve valve. After the set saw pressure is reached, the pressure relief valve does not cause additional counter pressure. As a result, the hydraulic motor can rotate faster, which is an additional advantage.

Preferably the first inlet port is connected to the second pressure line via a kick-off valve instead of a sequencing valve. This measure will increase the oil supply to the hydraulic motor.

In order to hold the clamping power delivered by a second hydraulic actuator, comprising a second double-action hydraulic cylinder, for opening and closing the clamp, and to maximise the oil pressure for the hydraulic motor, a load holding valve is provided which load holding valve comprises second inlet ports and a second outlet port, wherein second inlet ports are respectively connected to the first and second pressure line and the second double-action hydraulic cylinder is connected to the first pressure line and the second outlet port.

In order to control the speed of the first hydraulic actuator the double-action hydraulic cylinder of the third hydraulic actuator is connected to the first outlet port of the hydraulic motor via a non return throttle valve.

The invention also relates to a vehicle provided with a hydraulically controlled head according to the invention.

The improved head for harvesting of trees is further elucidated by the following figures, wherein.

Figure 1:
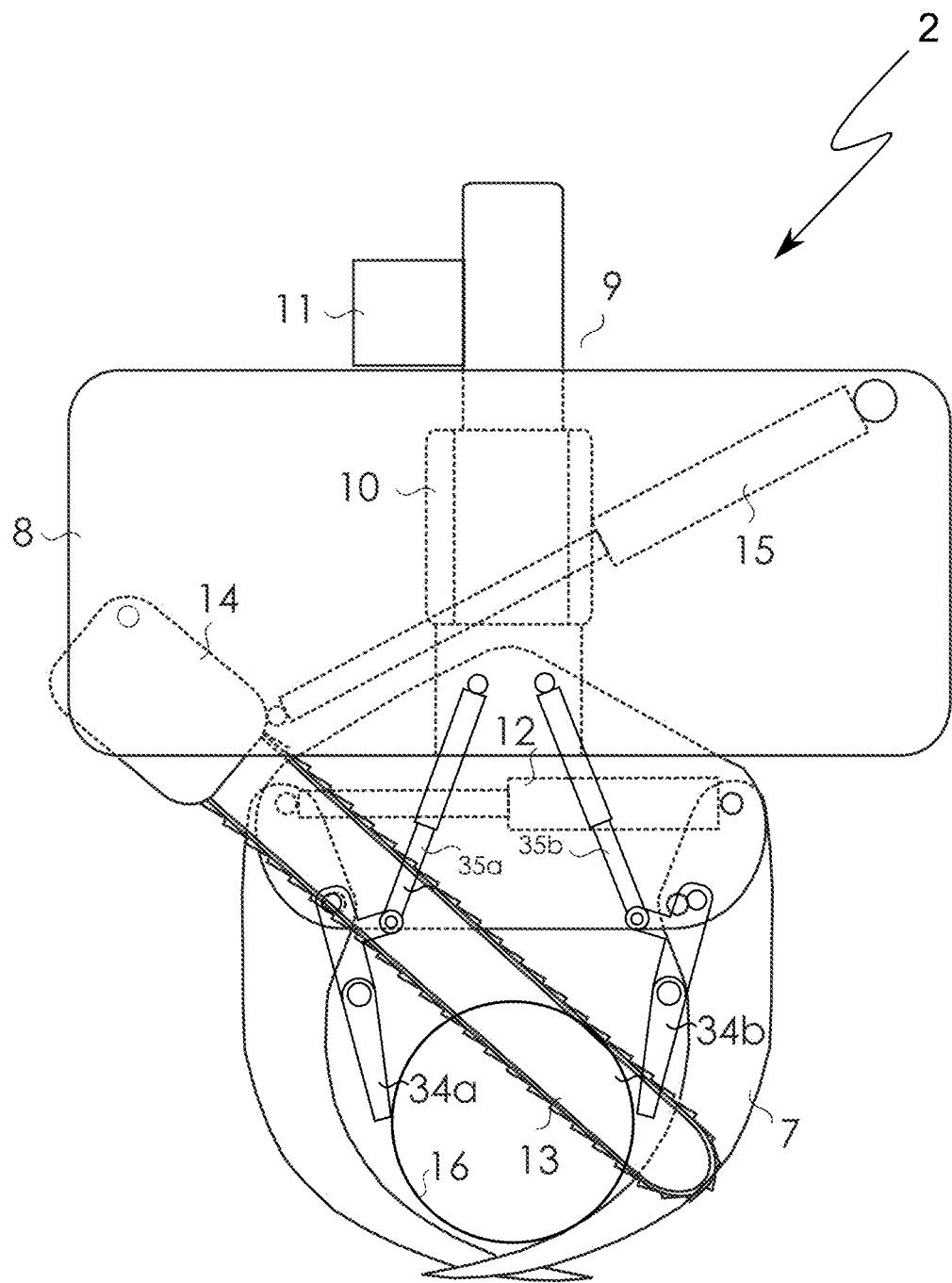
FIG. 1 shows a cross-section of the known head.

FIG. 1 shows a schematic view of a practical embodiment of a head 2 according to the invention, during sawing, consisting of a clamp 7 comprising a first hydraulic actuator 12 and a tilting mechanism 9 comprising a second hydraulic actuator 10 which in an operative mode is connected to the hydraulic rotary coupling 3 (not shown in this figure), and a saw casing 8 in which is accommodated a chainsaw 13 provided with a hydraulic motor 14, and with a third hydraulic actuator 15 which can press chainsaw 13 out of saw casing 8. During sawing third hydraulic actuator 15 causes the chainsaw 13 driven by hydraulic motor 14 to be pressed through a tree trunk 16 situated in clamp 7. An additional clamp is provided, which consists of two clamp halves 34a,34b which are controlled by an additional actuator, which in the embodiment shown here consists of two sub-actuators 35a,35b. Clamp halves 34a,34b can hold a number of trunks at the moment clamp 7 is opened to clamp round and saw off another trunk. Clamp halves 34a,34b take an articulated form so that the outer ends can move apart when an additional trunk must be gripped.

Figure 2:
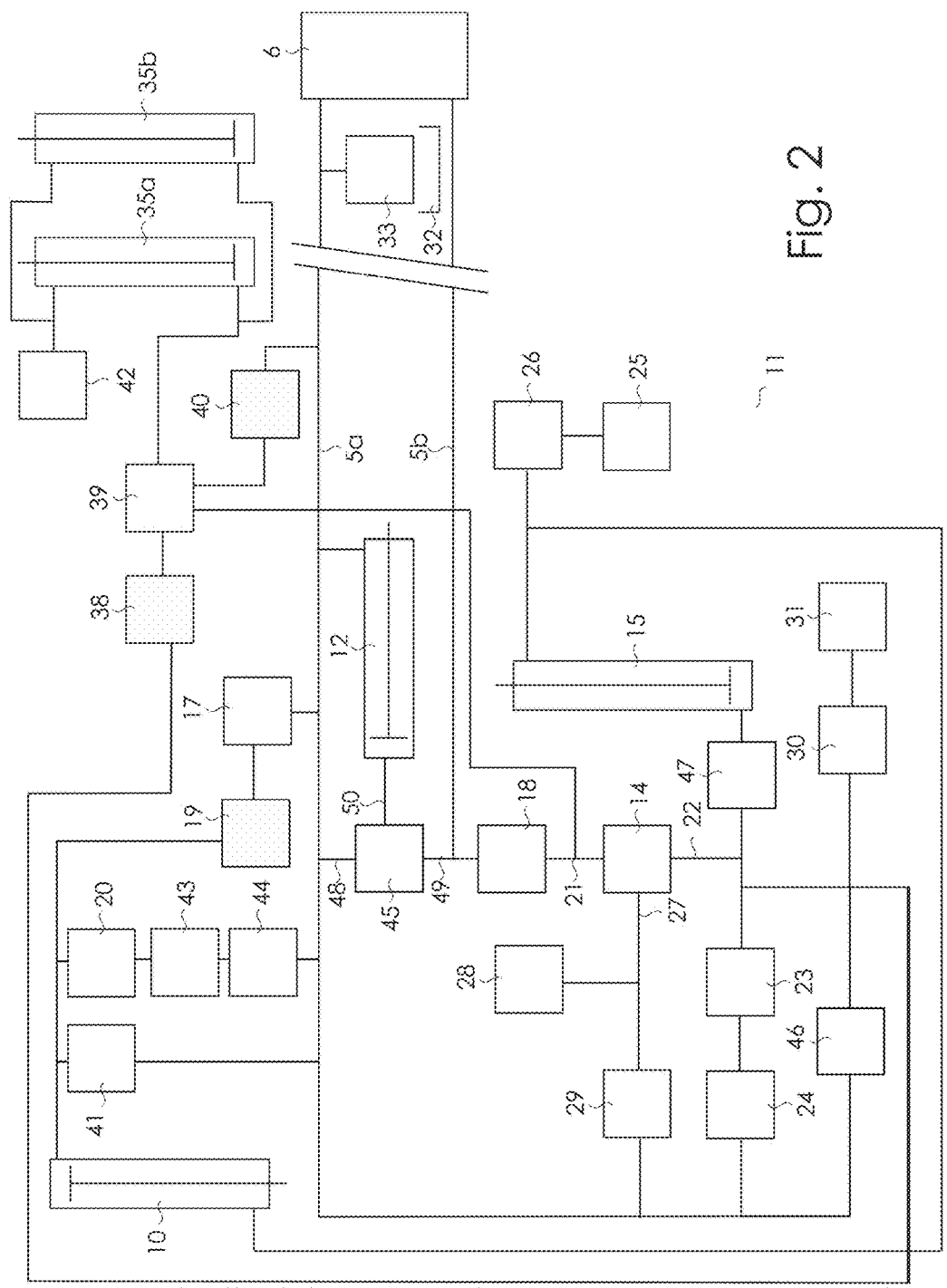
FIG. 2 shows a hydraulic diagram for controlling the head.

FIG. 2 shows schematically a best mode of a hydraulic control 11 for the head, with first pressure line 5a and second pressure line 5b which come from double-action hydraulic valve 6 and which are adapted in the first instance to operate the first hydraulic actuator 12. First hydraulic actuator comprises a second double-action hydraulic cylinder, for opening and closing the clamp 7. A load holding valve 45 is provided which comprises a second inlet port 48, a third inlet port 49 and a second outlet port 50, wherein the second inlet ports 48, is connected to the first pressure line 5a, the third inlet port 49 is connected to the second pressure line 5b and the double-action hydraulic cylinder of first hydraulic actuator 12 is connected to the first pressure line 5a and the second outlet port 50. Load holding valve 45 ensures that the hydraulic actuator 12 is kept at maximum pressure. This has the advantage that hydraulic motor 14 can utilize the full pressure drop or delta p.

In order to utilize the full pressure drop or delta p the driver allows the pressure in one of the pressure lines to rise to for instance 100 bar. Connected according to the invention to first pressure line 5a is a first sequencing valve 17 which makes it possible to operate hydraulic actuator 10 by allowing the pressure in first pressure line 5a to rise higher.

Further connected to second pressure line 5b is a kick-off valve 18 which makes it possible to operate hydraulic motor 14 by allowing the pressure in second pressure line 5b to rise higher. If the driver does not allow the pressure in first pressure line 5a and in second pressure line 5b to rise higher than for instance 100 bar, clamp 7 can then be used normally and first sequencing valve 17 and kick-off valve 18 remain closed.

When hydraulic valve 6 is set such that the pressure in first pressure line 5a rises, clamp 7 is opened. If the pressure subsequently rises higher than for instance 100 bar, first sequencing valve 17 then opens and oil can flow to hydraulic actuator 10 via a first throttle control valve 19, whereby clamp 7 is rotated in stages into the horizontal position. When hydraulic valve 6 is subsequently switched over, the pressure in first pressure line 5a then falls and the pressure in second pressure line 5b increases, whereby clamp 7 will close. Oil can also flow out of hydraulic actuator 10 via an adjustable throttle non-return valve 20, the normally opened 2/2 valve 43 (hydraulically controlled by the output pressure of the hydraulic motor 14) and the non return valve 44 to pressure line 5a, so that clamp 7 can rotate to the vertical position. The speed of the hydraulic actuator 10 can be controlled by adjusting throttle non-return valve 20.

If the pressure in second pressure line 5b rises higher than for instance 100 bar, kick-off valve 18 then opens and oil can flow to first inlet port 21 of hydraulic motor 14, whereby chainsaw 13 is set into motion. The oil flows to first pressure line 5a via an first outlet port 22 and via a second throttle control valve 23 and a first second non-return valve 24. The pressure at first outlet port 22 of hydraulic motor 14 will rise due to the presence of throttle control valve 23. Also the risen oil pressure at first outlet port 22 will cause the hydraulically controlled 2/2 valve 43 to close. As a result the second hydraulic actuator 10 cannot slip down during sawing. This pressure is utilized to control third hydraulic actuator 15, whereby chainsaw 13 is pressed out of saw casing 8. To control the speed of the third hydraulic actuator 15, a forth non return throttle valve 47 is used to connect the first outlet port 22 to the third hydraulic actuator 15. The pressure in the third hydraulic actuator 15 is controlled by the outlet pressure of the hydraulic motor 14 by controlling the adjustable pressure relief valve 46 with the additional return pressure in first pressure line 5aTherefore the pressure in the third hydraulic actuator 15 is kept constant and independent of the amount of oil or the temperature of the oil. Therefore a constant force will be applied by the third hydraulic actuator 15 on the saw blade. As a result, the saw can be operated with little oil pressure, but also with high oil pressure.

When first outlet port 22 is pressure less and thus the saw blade is retracted, the hydraulically controlled valve 43 is released, causing the second actuator 10 to tilt down or rotate into a horizontal position.

A pressure relief valve 46 is provided connecting the first outlet port 22 to the pressure line 5a parallel over the throttle control valve 23 and the second non-return valve 24.

In order to press back the third hydraulic actuator 15 a hydraulic accumulator 25 is also provided, which comes into operation as soon as kick-off valve 18 closes. If desired, an adjustable throttle non-return valve 26 can be received between third hydraulic actuator 15 and hydraulic accumulator 25, which valve can be adjusted such that chainsaw 13 remains outside saw casing 8 and the chain can be replaced.

Hydraulic motor 14 is generally provided with a drain port 27 to protect the hydraulic motor against pressure peaks in the first pressure line during sawing. Provided for the purpose of discharging the drain oil are a second hydraulic accumulator 28 and a second first non-return valve 29, via which the oil is fed back to first pressure line 5a.

At first outlet port 22 of hydraulic motor 14 the pressure increases each time sawing is started. A per se known hydraulic saw lubricant pump 30, which pumps chain lubricant out of a reservoir 31 and drips it onto chainsaw 13, can therefore be connected to first outlet port 22.

When pressure lines 5a,5b are not operated they are generally blocked. In order to allow run-off to an oil reservoir 32 of vehicle 1 of the oil from actuator 10 and the drain oil from hydraulic motor 14, which is temporarily stored in accumulator 28, and the oil from third actuator 15, there is preferably mounted in first pressure line 5a a hose rupture protection 33 which blocks as soon as hydraulic valve 6 is switched over. The purpose of hose rupture protection 33 is to drain first pressure line 5a by approximately 10% in order to drain the remaining hydraulic oil when hydraulic valve (6) is not operated. Therefore, instead of a hose rupture protection 33 a hydraulic lowering valve or a hydraulic speed control valve can also be used.

To control sub-actuators 35a,35b a hydraulic 3/2 valve 39 is arranged, the supply port of which is connected to the outlet of kick-off valve 18. The switch port is connected via a throttle non-return valve 38 to the outlet of hydraulic motor 14, where a pressure builds up during sawing. The exhaust port of hydraulic 3/2 valve 39 is connected via a non-return valve 40 to first pressure line 5a. The result is that clamp halves 34a,34b open during sawing so that the trunk being sawn through at that moment can be enclosed. When sawing stops, clamp halves 34a,34b will then close slowly because hydraulic oil flows away via throttle non-return valve 38. A driver can then place the felled trees in a transporting position or cut down another tree. In order to prevent the head being loaded too heavily, a pressure relief valve 41 is added which lies in parallel with throttle non-return valve 20. When the pressure on hydraulic actuator 10 rises too high, pressure relief valve 41 then opens and the head is automatically rotated into the transporting position. Finally, another hydraulic accumulator 42 is added which is set to a predetermined pressure of for instance 15 mPa and which ensures that clamp halves 34a,34b remain closed when no sawing is taking place.

The additional clamp formed by clamp halves 34a,34b and the corresponding hydraulic elements are an optional feature.

The invention claimed is:

1. A hydraulically controlled head (2) for harvesting trees, which head is arranged for attachment on a vehicle (1) with a hydraulic pump unit, which head (2) comprises a
   double-action hydraulic valve (6) for connecting to the hydraulic pump unit,
   a clamp (7) for placement round a tree, comprising a first hydraulic actuator (12)
   a tilting device (9) for tilting the clamp (7), comprising a second hydraulic actuator (10),
   a chainsaw (13) for sawing through a clamped tree, comprising a hydraulic motor (14),
   a saw displacement device for causing the blade of the chainsaw to move out of and into a saw casing, comprising a third hydraulic actuator (15) and
   a first pressure line (5a) and a second pressure line (5b), the first pressure line (5a) and the second pressure line (5b) each connecting the hydraulic valve (6) to the first hydraulic actuator (12), the second hydraulic actuator (10) and the third hydraulic actuator (15), the hydraulic motor (14) comprises an inlet port (21), a first outlet port (22) and a drain port (27), wherein the drain port is connected via a first non-return valve (29) to the first pressure line (5a) and is provided with a first hydraulic accumulator (28), and the first outlet port (22) is connected via a throttle control valve (23) and a second non-return valve (24) to the first pressure line (5a), and the first inlet port (21) is connected to the second pressure line (5b), wherein the third hydraulic actuator (15) comprises a double-action hydraulic cylinder which is connected to the first outlet port (22) of the hydraulic motor (14) and, via a third non-return valve (26), to a second hydraulic accumulator (25), and a hydraulic control unit suitable for controlling the first hydraulic actuator (12), the second hydraulic actuator (10) and the third hydraulic actuator (15) and the hydraulic motor (14), wherein the head (2) comprises control means for controlling the saw pressure and the saw speed by the oil pressure at the first outlet port (22) of the hydraulic motor (14).

2. A hydraulically controlled head (2) according to claim 1, wherein a pressure relief valve (46) is provided connecting the first outlet port (22) to the first pressure line (5a) such that the pressure relief valve (46) is connected parallel to the throttle control valve (23) and the non-return valve (24).

3. A hydraulically controlled head (2) according to claim 2, wherein the first hydraulic actuator (12) comprises a double-action hydraulic cylinder for opening and closing the clamp and a load holding valve (45) is provided which load holding valve (45) comprises a second inlet port (48), a third inlet port (49) and a second outlet port (50), wherein the second inlet port (48) is connected to first pressure line (5a), the third inlet port (49) is connected to the second pressure line (5b) and the second hydraulic actuator (10) comprises a second double-action hydraulic cylinder which is connected to the first pressure line (5a) and the second outlet port (50).

4. A hydraulically controlled head (2) according to claim 1, wherein the third hydraulic actuator (15) comprises a double-action hydraulic cylinder, which is connected to the first outlet port (22) of the hydraulic motor (14) via a fourth non-return valve (47).

5. Vehicle (1) provided with a hydraulically controlled head (2) for harvesting trees, which head is arranged for attachment on a vehicle (1) with a hydraulic pump unit, which head (2) comprises a double-action hydraulic valve (6) for connecting to the hydraulic pump unit, a clamp (7) for placement round a tree, comprising a first hydraulic actuator (12)

a tilting device (9) for tilting the clamp (7), comprising a second hydraulic actuator (10), a chainsaw (13) for sawing through a clamped tree, comprising a hydraulic motor (14), a saw displacement device for causing the blade of the chainsaw to move out of and into a saw casing, comprising a third hydraulic actuator (15) and a first pressure line (5a) and a second pressure line (5b) for connecting the hydraulic valve (6) to the first hydraulic actuator (12), the second hydraulic actuator (10) and the third hydraulic actuator (15), the hydraulic motor (14) comprises an inlet port (21), a first outlet port (22) and a drain port (27), wherein the drain port is connected via a first non-return valve (29) to the first pressure line (5a) and is provided with a first hydraulic accumulator (28), and the first outlet port (22) is connected via a throttle control valve (23) and a second non-return valve (24) to the first pressure line (5a), and the first inlet port (21) is connected to the second pressure line (5b), wherein the third hydraulic actuator (15) comprises a double-action hydraulic cylinder which is connected to the first outlet port (22) of the hydraulic motor (14) and, via a third non-return valve (26), to a second hydraulic accumulator (25), and a hydraulic control unit suitable for controlling the first hydraulic actuator (12), the second hydraulic actuator (10) and the third hydraulic actuator (15) and the hydraulic motor (14), wherein the head (2) comprises control means for controlling the saw pressure and the saw speed by the oil pressure at the first outlet port (22) of the hydraulic motor (14).

* * * * *